United States Patent
Salmon

(10) Patent No.: US 7,286,230 B1
(45) Date of Patent: Oct. 23, 2007

(54) ALIGNMENT SYSTEM, DEVICE AND METHOD

(76) Inventor: D'Miles Salmon, P.O. Box 719, Jacksonville, OR (US) 97530

( * ) Notice: Subject to any disclaimer, the term of this patent is extended or adjusted under 35 U.S.C. 154(b) by 284 days.

(21) Appl. No.: 10/811,451

(22) Filed: Mar. 25, 2004

Related U.S. Application Data

(60) Provisional application No. 60/460,076, filed on Apr. 2, 2003.

(51) Int. Cl.
| | |
|---|---|
| *G01B 11/26* | (2006.01) |
| *G01B 11/00* | (2006.01) |
| *G01B 11/14* | (2006.01) |
| *G01C 1/00* | (2006.01) |
| *A63B 67/02* | (2006.01) |
| *A63B 69/36* | (2006.01) |
| *A63B 57/00* | (2006.01) |

(52) U.S. Cl. .................. 356/399; 356/138; 356/614; 473/150; 473/151; 473/219; 473/220; 473/222

(58) Field of Classification Search ............ None
See application file for complete search history.

(56) References Cited

U.S. PATENT DOCUMENTS

| | | | | | |
|---|---|---|---|---|---|
| 4,979,754 | A | * | 12/1990 | Eisenhart ................ | 473/222 |
| 5,324,039 | A | * | 6/1994 | Reimers et al. ........... | 473/222 |
| 5,330,188 | A | | 7/1994 | Reimers .................. | 273/186.1 |
| 5,419,562 | A | * | 5/1995 | Cromarty ................. | 473/269 |
| 5,692,966 | A | * | 12/1997 | Wash .................... | 473/221 |
| 5,980,393 | A | | 11/1999 | Molinaroli et al. ........ | 473/220 |
| 6,095,928 | A | * | 8/2000 | Goszyk ................... | 473/222 |
| 6,375,579 | B1 | * | 4/2002 | Hart ..................... | 473/131 |
| 6,402,634 | B2 | * | 6/2002 | Lee et al. ............... | 473/223 |

(Continued)

OTHER PUBLICATIONS

"Wrong putting exercises may possibly harm your golf." www.dixxgolf.com/eng/intro/sub_01_1.asp, no date.

(Continued)

*Primary Examiner*—Gregory J. Toatley, Jr.
*Assistant Examiner*—Gordon J. Stock, Jr.
(74) *Attorney, Agent, or Firm*—Haverstock & Owens LLP

(57) ABSTRACT

A system for aligning an object with a target is disclosed. The system allows an operator to monitor the alignment of the object, either while the object is stationary or while the object is moving through a trajectory, without requiring that the operator directly view the target. The system preferably comprises a positioning unit for attaching to the object, such as a golfing putter, and a target unit for positioning at, near or over a target location, such as a hole. The positioning unit and the target unit are in two-way communication to detect and to indicate alignment of the object with the target. Preferably, the positioning unit emits light that is preferably laser light or infrared light, and the target unit detects that light when the units are aligned. When the positioning unit and the target unit are aligned, the target unit emits an alignment signal that is preferably a radio signal. The radio signal initiates a display element for indicating that the object and target are aligned.

26 Claims, 6 Drawing Sheets

U.S. PATENT DOCUMENTS

| | | | | |
|---|---|---|---|---|
| 6,821,211 | B2* | 11/2004 | Otten et al. | 473/219 |
| 6,923,728 | B1* | 8/2005 | Lin | 473/220 |
| 7,182,697 | B2 | 2/2007 | Zamora | 473/251 |
| 7,214,138 | B1* | 5/2007 | Stivers et al. | 473/199 |
| 2002/0173365 | A1* | 11/2002 | Boscha | 473/131 |
| 2007/0105637 | A1* | 5/2007 | Shimizu | 473/151 |
| 2007/0105639 | A1* | 5/2007 | Hasegawa | 473/221 |

OTHER PUBLICATIONS

"Wrong putting exercises may possibly harm your golf." www.dixxgolf.com/eng/intro/sub_01_1.asp, no date.

"Wrong putting exercises may possibly harm your golf." www.dixxgolf.com/eng/intro/sub_01_1.asp.

* cited by examiner

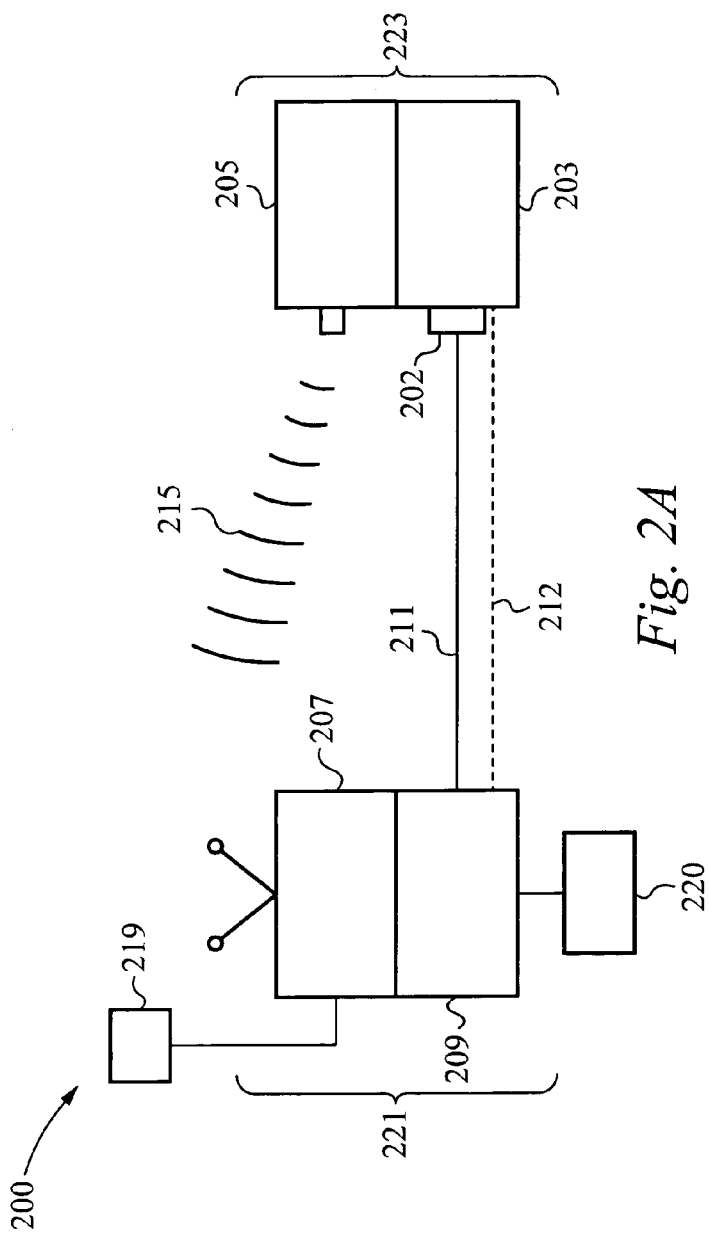
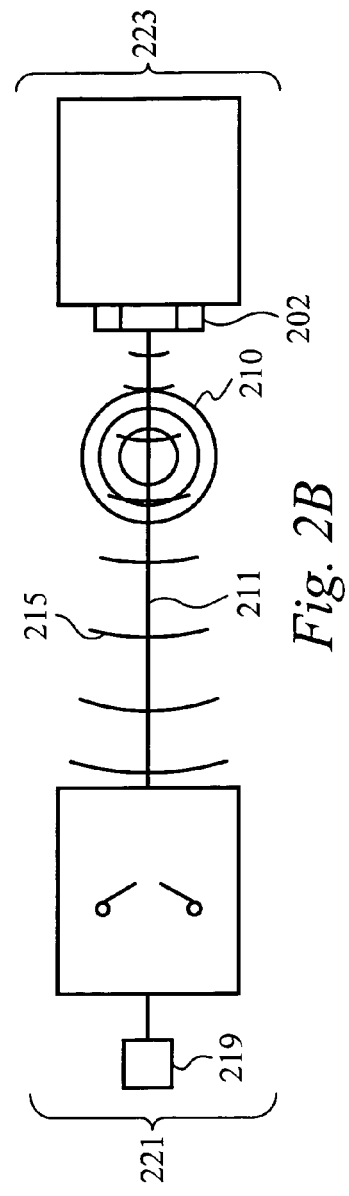
Fig. 2A
Fig. 2B

ALIGNMENT SYSTEM, DEVICE AND METHOD

RELATED APPLICATION

This patent application claims priority under 35 U.S.C. 119 (e) of the co-pending U.S. Provisional Patent Application Ser. No. 60/460,076, filed Apr. 2, 2003, and titled "ALIGNMENT SYSTEM, DEVICE AND METHOD." The co-pending U.S. Provisional Patent Application Ser. No. 60/460,076, filed Apr. 2, 2003, and titled "ALIGNMENT SYSTEM, DEVICE AND METHOD" is also hereby incorporated by reference.

FIELD OF THE INVENTION

The invention relates to alignment systems, devices and methods. More particularly, the present invention relates to alignment systems, devices for and methods of detecting alignment of a moving object.

BACKGROUND OF THE INVENTION

There are a number of alignment systems which facilitate the alignment of an object with a target. For example, there are laser-based alignment systems which emit laser light onto a target to indicate that an object and the target are aligned. There are also a number of optical based alignment systems, such as rifle scopes and the like, wherein optical elements of the system are designed to allow an operator to visually align an object with a target. The aforementioned laser-based alignment systems and optical based alignment systems require that the operator can see the target to properly align the object with the target. Further, these alignment systems are not well suited for indicating and/or monitoring the alignment of a moving object with a stationary and/or moving target.

There are several applications where it is preferable to align an object with a target while not looking at the target and/or while the target is out of the operator's view. For example, when a large airplane is being parked at a gate after landing, the pilot generally can not see the target parking position sufficiently to maneuver the plane into the target parking position. Accordingly, the plane is typically guided with one or more persons outside of the plane directing the plane into the target parking position.

Other applications where it is preferable to align an object with a target while not looking at the target and/or while the target is out of the operator's view is while using a golfing putter. While putting, a golfer aligns the putter with a golf ball and a target location. Preferably, the golfer generally looks at the ball and the club (not the target) and strikes, or strokes, the ball moving the putter in a straight line through the golf ball to direct or project the golf ball towards the target. In the aforementioned applications and numerous other applications, an object and a target are preferably aligned without looking at the target and/or while the target is out of the operator's view.

Accordingly, what is needed is a system, device for and method of aligning an object with a target, wherein the alignment of the object with the target can be accomplished without requiring visual contact with the target. Further, what is needed is an alignment system and device for and method of monitoring the alignment of an object which is moving in a trajectory relative to a target.

SUMMARY OF THE INVENTION

In accordance with the embodiments of the invention an alignment system is configured to monitor the trajectory of an object as the object moves in a trajectory toward a target. In a preferred embodiment of the invention, the alignment system is configured for monitoring the swing, or stroke, of a putter to facilitate a golfer's ability to perfect his putting skills and to hit a golf ball in a trajectory towards a golfing target.

The alignment system preferably comprises a first transmitter and a first receiver. The first transmitter is configured for transmitting positioning signals from the object and the first receiver is configured for receiving alignment signals at, near or over the target. Preferably, the first transmitter and the first receiver are coupled together and are housed in a positioning unit housing along with related optics and circuitry, as explained below. The positioning unit housing is preferably configured to detachably couple to the object. The first transmitter is preferably a laser or infrared transmitter for transmitting positioning signals in a direction corresponding to the trajectory and/or target path of the object. The positioning signals can be formed from any suitable electromagnetic radiation, but are preferably formed from laser or infrared radiation. The first receiver is preferably a radio receiver configured to receive radio alignment signals at, near or over the target.

The system also preferably comprises a second transmitter and a second receiver. The second transmitter and second receiver are preferably coupled together and housed in a target unit housing. The target unit housing is preferably configured for detachably coupling to a position at, near or over the target. The second transmitter is preferably a radio-frequency transmitter for transmitting the radio alignment signals to the first receiver and the second receiver is preferably a photo-sensor for receiving the laser or infrared positioning signals transmitted from the first transmitter.

The system, in accordance with embodiments of the invention, comprises an indicator element for indicating when the first transmitter is aligned with the second receiver or, conversely, to indicate when the first transmitter is out of alignment with the second receiver. Preferably, the indicator element is a light display that is coupled to the positioning unit housing, wherein the light is on when the first transmitter and the second receiver are aligned.

In further embodiments of the invention, the alignment system comprises optics positioned in the path of the light beam for focusing the light beam into an elongated light beam. In accordance with this embodiment, the system has enhanced ability to detect and/or monitor the axial alignment of the object relative to the target. The system also preferably comprises optics in the optical path of the photo-detector for filtering undesired background light.

In a preferred mode of operation, a positioning unit comprising the first receiver, the first transmitter, optics and related circuitry is coupled to the object. A target unit comprising the second transmitter, the second receiver, optics and related circuitry is positioned at, near or over the target. The first transmitter emits a continuous positioning signal. When the first transmitter is aligned with the second receiver, the second receiver detects the positioning signal and initiates the second transmitter to emit a continuous alignment signal. The alignment signal is received and detected by the first receiver and the first receiver initiates the indicator element to indicate the object is aligned with the target. When the first transmitter is out of alignment with the second receiver, or out of the field of detection, then the second transmitter stops the transmission of the alignment signal and the indicator element indicates the object is out of alignment with the target.

BRIEF DESCRIPTION OF THE DRAWINGS

FIGS. 2a-b show schematic perspective views of an alignment system comprising a positioning unit and a target unit, in accordance with the instant invention.

DETAILED DESCRIPTION OF THE INVENTION

Figure 1A:
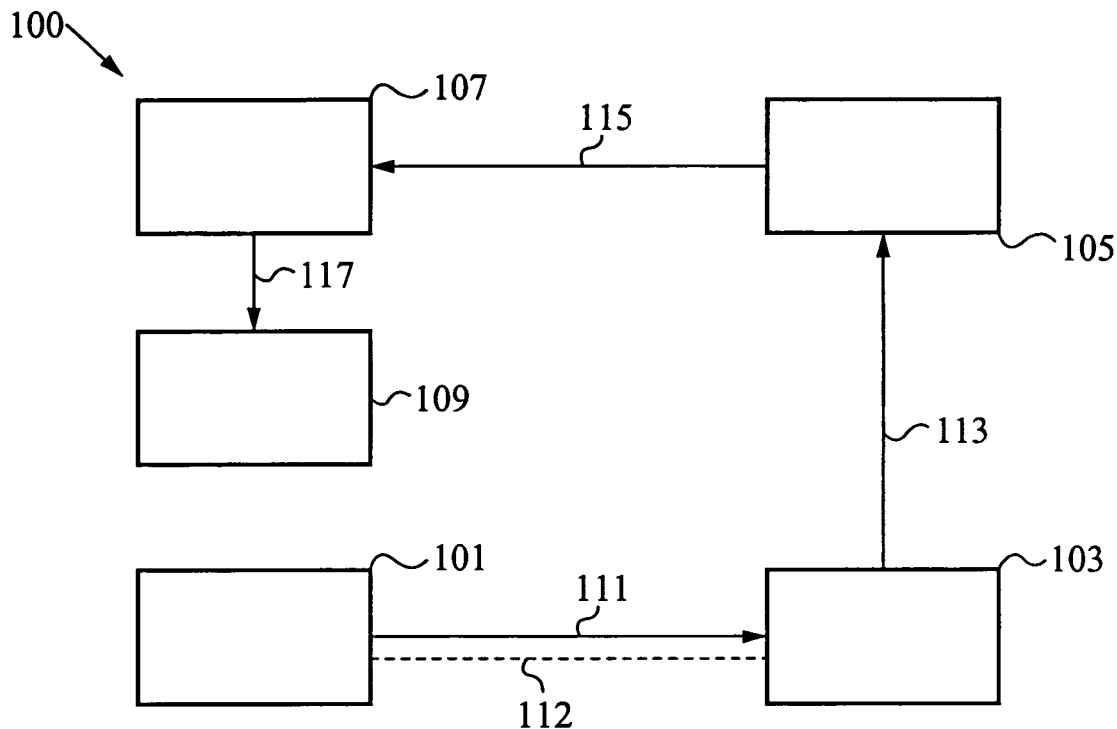
FIGS. 1a-b show schematic perspective views of an alignment system, in accordance with the embodiments invention.
Figure 1B:
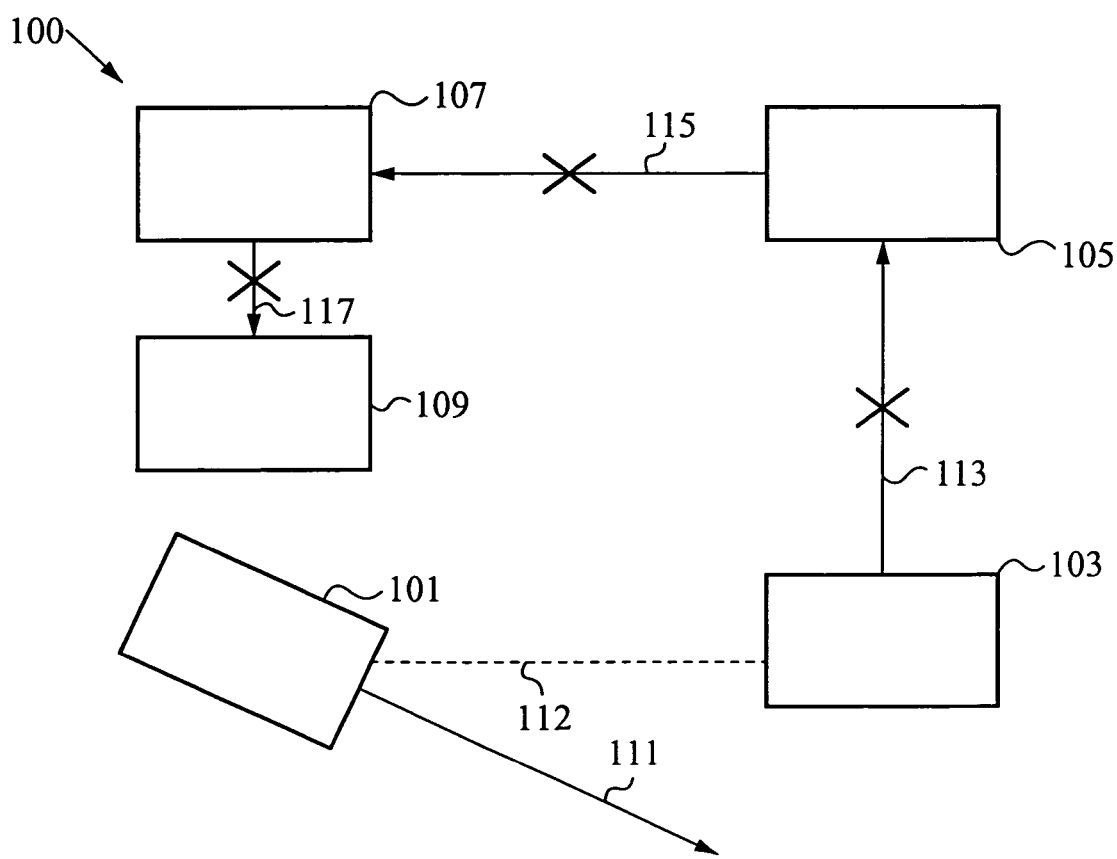

FIGS. 1a-b illustrate components of an alignment system 100 in accordance with the embodiments of the invention. The system 100 comprises a first transmitter 101 and a first receiver 107. The first transmitter 101 is configured for transmitting a positioning signal, as indicated by the arrow 111, from an object or an object location (not shown). The system also comprises a first receiver 107 configured for receiving and detecting an alignment signal, as indicated by the arrow 115, that is transmitted at, near or over a target or target location (not shown). The system 100 further comprises a second transmitter 105 and a second receiver 103. The second transmitter 105 is configured for transmitting the alignment signal 115 and the second receiver 103 is configured for receiving and detecting the positioning signal 111. The alignment system 100 also preferably comprises an indicator 109 for indicating when the first transmitter 101 and the second receiver 103 are in alignment, as indicated by the dotted line 112. The indicator 109 is any suitable indicator configured to generate a visual signal, an audio signal or any other suitable signal to indicate the alignment of the first transmitter 101 and the second receiver 103.

In operation, the first transmitter 101 transmits the positioning signal 111. When the first transmitter 101 and the second receiver 103 are aligned 112, as shown in FIG. 1a, then the positioning signal 111 is received and detected by the second receiver 103. When the positioning signal 111 is received and detected by the second receiver 103, the second receiver 103 instructs the second transmitter 105 through a communication path, as indicated by the arrow 113, to transmit the alignment signal 115. The communication path 113 is an electrical, an optical, or a mechanical communication path or any combination thereof. After the alignment signal 115 is transmitted, then the first receiver 107 receives and detects the alignment signal 115. After the alignment signal 115 is detected by the first receiver 107, then the first receiver 107 instructs the indicator 109 through the communication path 117 to indicate alignment. The communication path 117, is an electrical, an optical, or a mechanical communication path or any combination thereof.

Referring to FIG. 1b, when the first transmitter 101 moves out of the alignment path 112, it fails to transmit a sufficiently strong positioning signal 111 and/or is shut off, then the second detector 103 does not instruct the second transmitter 105 through the communication path 113 to transmit the alignment signal 115. Accordingly, the first receiver 107 does not instruct the indicator 109 through the communication path 117 to indicate alignment and the operator of the system can discern that the first transmitter 101 and the second receiver 103 are now out of alignment.

The first transmitter 101 preferably comprises a laser or infrared element (not shown) for generating light positioning signals 111 and the second receiver 103 preferably comprises a photo-sensor (not shown) for detecting the light positioning signal 111. The second transmitter 105 preferably comprises a radio-frequency transmitter (not shown) for generating a radio alignment signal 115 and the first receiver 107 preferably comprises a radio-frequency receiver (not shown) for detecting the radio frequency alignment signal 115. The indicator element 109 can be any indicator, but is preferably a light display that is on when the first transmitter 101 and the second receiver 103 are aligned, as shown in FIG. 1a, and is off when the first transmitter 101 and the second receiver 103 are out of alignment, as shown in FIG. 1b.

Now referring to FIGS. 2a-b, an alignment system 200 in accordance with the embodiments of the invention comprises a positioning unit 221 and a target unit 223 for aligning an object 220 with a target 210. The positioning unit 221 is preferably configured to detachably couple to the object 220 and monitor the alignment of the object 220 with the target 210. The positioning unit 221 preferably comprises a laser transmitter or infrared transmitter 209 and a radio receiver 207, as described above. If the transmitter 209 is a laser transmitter, the laser transmitter is preferably a low output class III laser with optics for transmitting an elongated laser beam, as described below. The radio receiver 207 is preferably a 27 MHz radio receiver and IC chip with passive components and which operates with two 3 volt battery cells.

The target unit 223 preferably comprises a radio transmitter 205 and a photo-detector 203, as described above. The radio transmitter 205 is preferably a multi-channel 27 MHz radio transmitter on an IC chip with passive components and which operates with four AA size 3 volt batteries. The photo-detector 203 is preferably coupled to optics configured to diffuse and/or filter background light and enhance the sensitivity and/or selectivity of the photo-detector 203 to detect the light generated by the transmitter 209. The target unit 223 is preferably configured for detachably coupling at, near or over the target 210.

FIG. 2b shows a top schematic view of the system 200 illustrated in FIG. 2a. During use, the target unit 223 is positioned at, near or over the target 210, such that when the object 220 is coupled to the positioning unit 221 and the positioning unit 221 and the target 210 are aligned along a path 212, then the positioning unit 221 and the target unit 223 are in two-way communication though light positioning signals 211 and radio alignment signals 215 and the display 219 indicates the alignment, as explained above. The system 200 is preferably configured to monitor alignment of the object 220 with the target 210 as the object 220 is moved in a trajectory along the target path 212.

Figure 3:
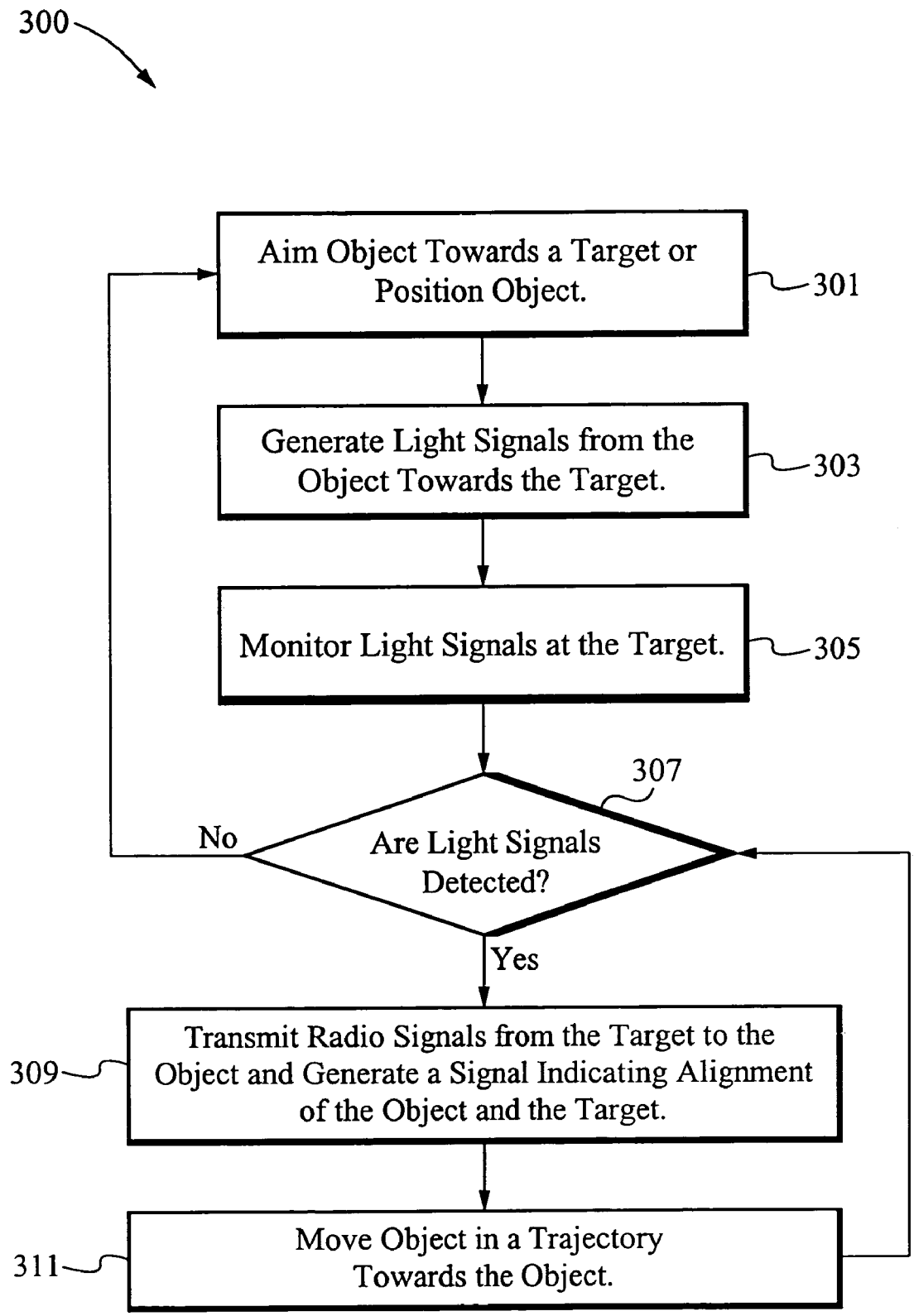
FIG. 3 is a schematic block diagram outlining steps for aligning an object with a target, in accordance with the instant invention.

FIG. 3 is a flow chart 300 illustrating the steps for monitoring the alignment of an object relative to a target, in accordance with a preferred method of the invention. In the step 301, the object is aimed or positioned in the path of the target. With the object aimed or positioned in the path of the target, then in the step 303 light signals are generated from the object and transmitted towards the target. After the light signals are transmitted from the object in the step 303, then in the step 305 the light signals are monitored at the target. In the step 307, it is determined whether light signals are detected at the target. If light signals are detected in the step 307, then in the step 309 radio signals are transmitted from the target to the object, whereby a signal is generated to indicate that the object is aligned with the target. When it has been determined that the object is in alignment with the target in the step 309, then in the step 311 the object is moved in a trajectory corresponding to the path towards the target. While, the object is being moved in a trajectory corresponding to the path of the target, the light signals are continuously being monitored at the step 307. If the light signals are not detected in the step 307, signals indicating alignment cease and the object is repositioned or aimed towards the target, as in the step 301, until the light signals are again detected. As described previously, the light signals can comprise any type or electromagnetic radiation but preferably comprise laser light or infrared light.

Figure 4A:
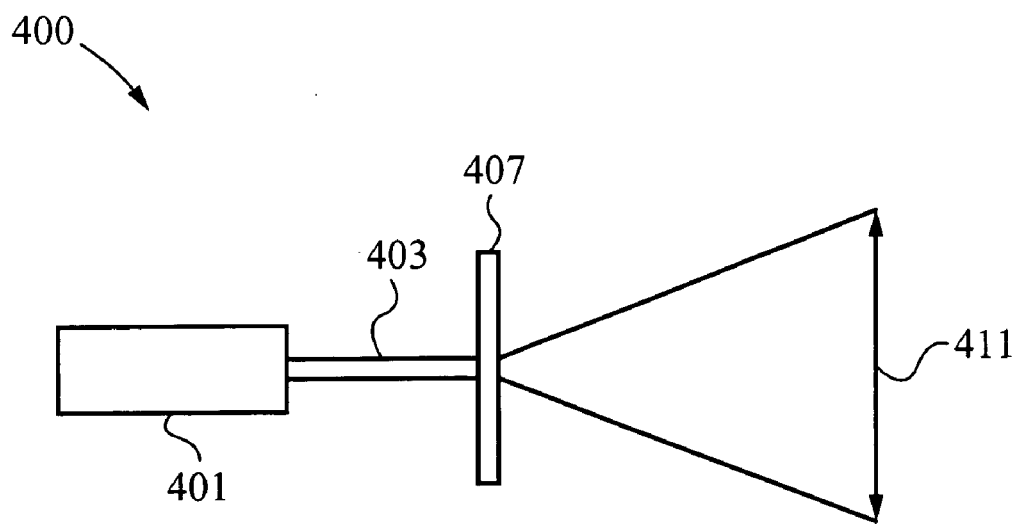
FIGS. 4a-b are schematic representations of transmission optics and detector optics for transmitting and receiving an elongated light beam, in accordance with the instant invention.

FIG. 4a shows an object transmitter configuration 400 for directing laser or infrared light from a positioning unit to a target unit, in accordance with the embodiments of the invention. As described above, the positioning unit preferably comprises a light source 401 for generating a laser or infrared light beam 403. The light beam 403 is preferably projected through optics 407 for focusing the light beam 403 into an elongated light beam 411. The optics preferably comprise a columnar lens and a plano positive lens (not shown) for transmitting the light beam into the elongated light beam 411.

Figure 4B:
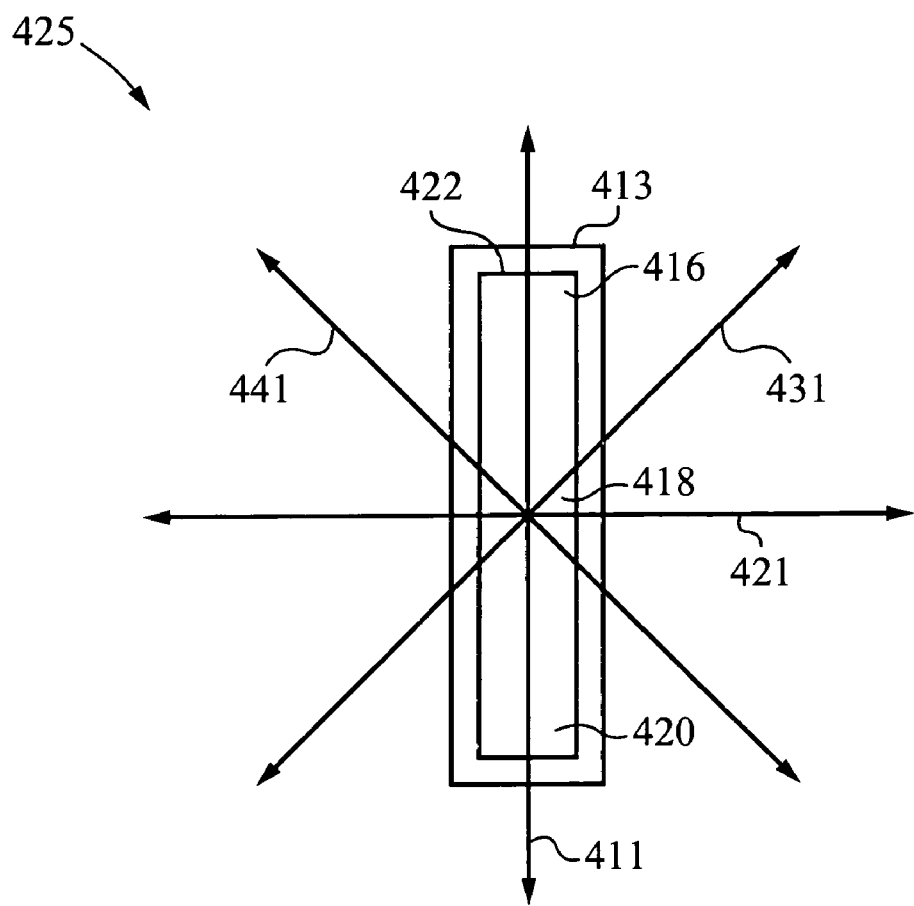

FIG. 4b illustrates a target receiver configuration 425 for receiving and detecting light from the object transmitter configuration 400, described above with reference to FIG. 4a. A photo-detector 413 unit is preferably elongated. In yet further embodiments the photo-detector 413 comprises a number of different sensing regions 416, 418 and 420. The photo-detector 413 also preferably comprises a reflective lens and a filter (not shown) positioned in the optical path of the photo-detector 413 to increase the sensitivity and/or selectivity of the photo-detector 413 to sense light generated from the light source 401 (FIG. 4a). The elongated photo-detector 413 is preferably capable of detecting the skew of the object unit from a path towards the target and/or the axial alignment of the object unit relative to the target unit. For example, because the detection area of the photo-detector 413 is elongated, the photo-detector 413 will have less tolerance for misalignment of the object unit horizontally and further will not sense a light beam that is rotated from angular alignment as indicated by the arrows 421, 431, and 441. Accordingly, when the light is skewed from the path of the photo-detector 413 or is out of angular alignment with the photo-detector 413, then the photo-detector 413 does not initiate the transmission of radio signals and the object unit indicates that the object is out of alignment with the target.

Figure 5A:
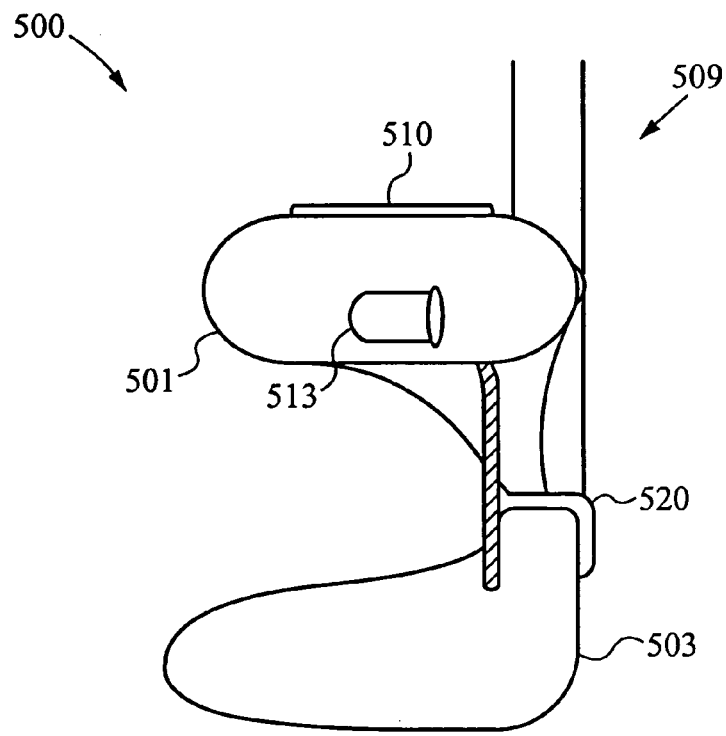
FIGS. 5a-b show a positioning unit for detachably coupling to a golfing putter, in accordance with a preferred embodiment of the invention.
Figure 5B:
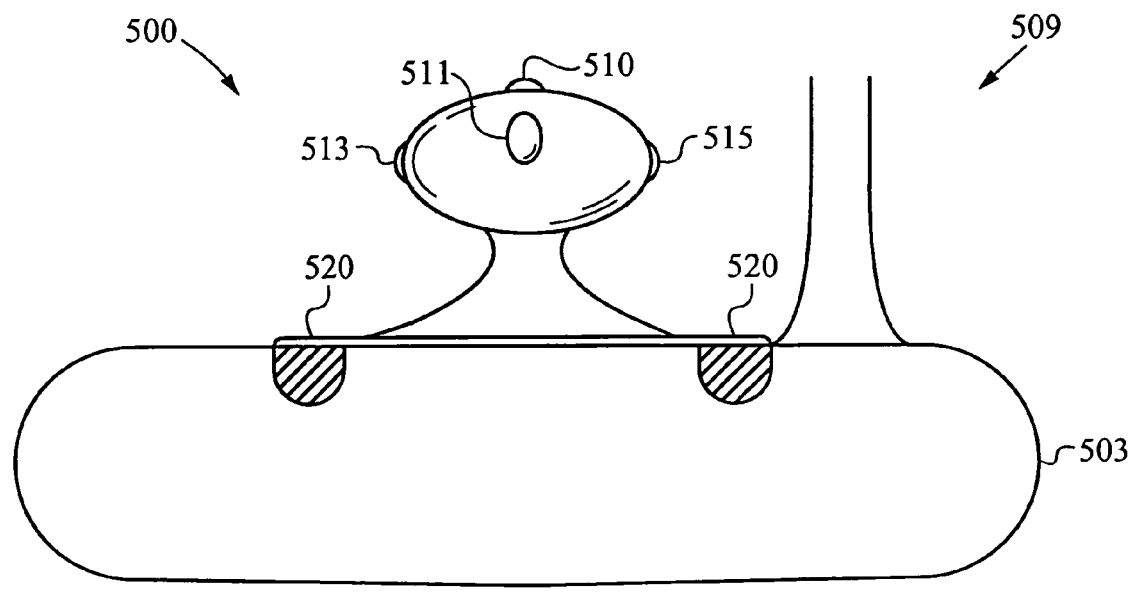

Referring to FIGS. 5a-b, the alignment system of the present invention preferably comprises a positioning unit 500 that is configured to detachably couple to a head 503 of a golf club 509, such as a golfing putter. The positioning object unit 500 comprises a housing structure 501 for housing the laser or infrared element, optics and related circuitry (not shown) for transmitting positioning signals, such as described above, as well as for housing a radio receiver for receiving alignment signals, also described above. The object unit 500 preferably is configured to detachably couple to the head 503 of the club 509 through release clip features 520 (FIG. 5b), that are released by depressing finger push tabs 513 and 515 on the each side of the object unit housing 501. Light is transmitted from an optical window 511 of the object unit housing 501 while attached to the club head 503. When the club head 503 is aligned with a target unit 600 (FIGS. 6a-b) then radio signals transmitted from the target unit 600 are detected by the positioning unit 500 and a light element 510 is turned on. When the club head 503 is not aligned with a target unit 600 (FIGS. 6a-b) then radio signals are not transmitted from the target unit 600 and the light element 510 is turned off.

Figure 6A:
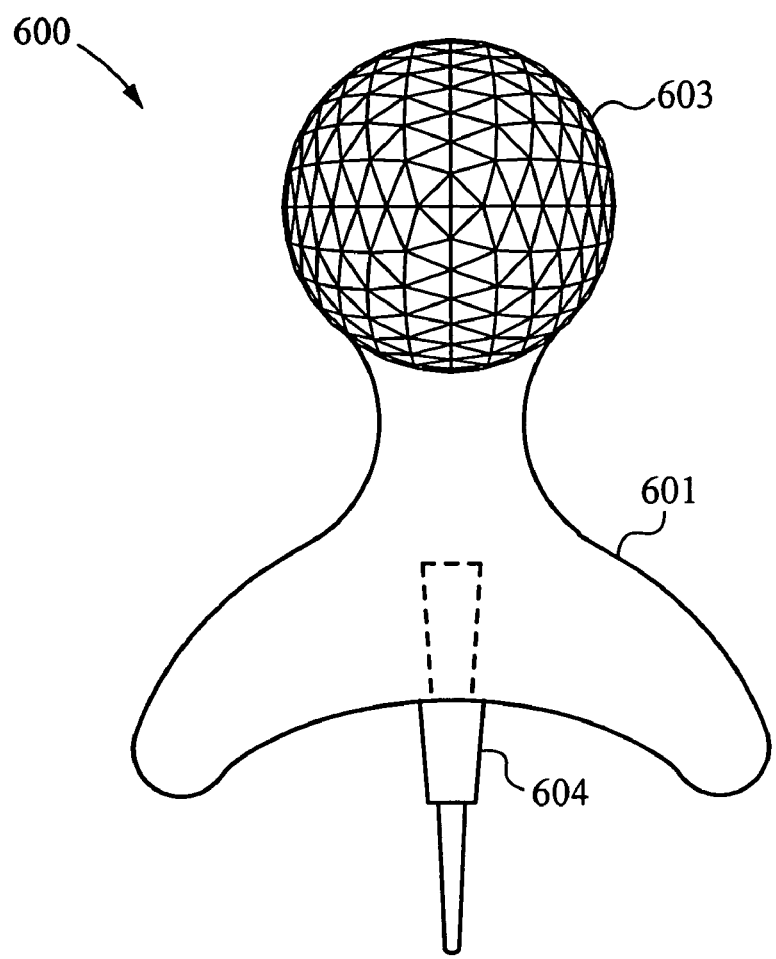
FIGS. 6a-b show a target unit for placing at, near or over a golfing target, in accordance with a preferred embodiment of the invention.
Figure 6B:
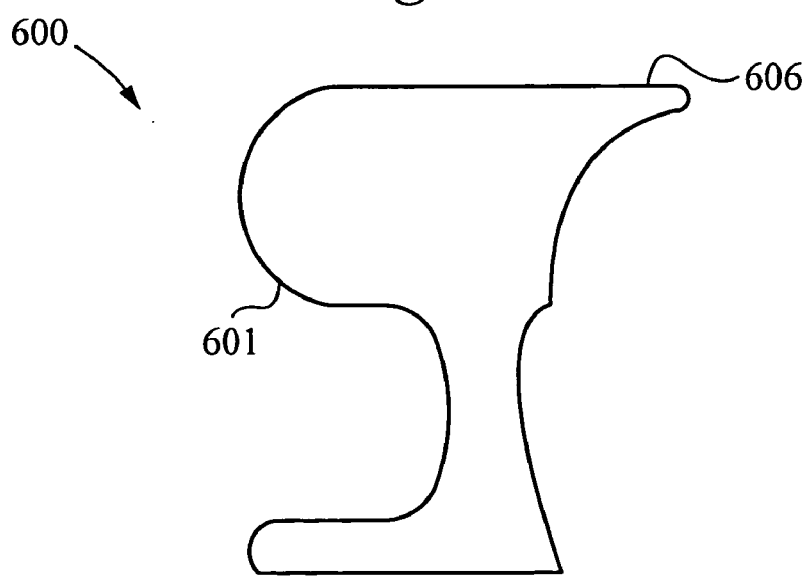

Referring now to FIGS. 6a-b, an alignment system of the present invention preferably comprises a target unit 600. The target unit 600 has a housing structure 601 for housing the photo-detector, the radio transmitter, optics and related circuitry (not shown) for transmitting radio alignment signals, such as described above, and for detecting positioning signals, also described above. The target unit 600 is preferably configured to be detachably coupled at, near to or over a target (not shown). Preferably, the target unit 600 is configured to detachably couple at, near or over a golfing target, such as a golf cup or hole using a spike feature 604 that can be inserted into the ground at, near or over the golfing target. The target unit preferably receives the positioning signals through an optical window 603 that is patterned or fenestrated to diffuse unwanted background light. The housing structure 601 is preferably fashioned with a visor structure 606 to help reduce the amount of background light that enters the optical window 603. When the positioning unit 500 (FIGS. 5a-b) is aligned with the target unit 600, then the target unit 600 receives and detects the light-based positioning signals and transmits radio alignment signals to the positioning unit 500 (FIGS. 5a-b) and the light element 510 is on. When the positioning unit 500 (FIGS. 5a-b) is not aligned with the target unit 600, then the target unit 600 does not transmit radio alignment signals to the positioning unit 500 (FIGS. 5a-b) and the light element 510 is off. The object unit 500, shown in FIGS. 5a-b, and the target unit 600, shown in FIGS. 6a-b, are particularly well suited for training golfers to perfect their putting stroke.

The present invention provides an alignment system comprising a positioning unit and the target unit that are in two-way communication to detect and to indicate the alignment of an object with a target. The alignment system allows an operator to align an object with a target without requiring visual contact with the target. Further, the alignment system of the present invention allows an operator to monitor the alignment of a moving object with respect to a trajectory towards the target.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention. Specifically, it will be apparent that the alignment system of the present invention can be used to align any number of stationary or moving objects with a target. For example, the alignment system of the present invention has applications in the alignment of moving vehicles, such as cars, trucks and/or planes, wherein the vehicles are being parked under conditions of limited visibility.

What is claimed is:

1. A positioning and alignment device comprising:
   a) a positioning object with a first transmitter and a first receiver for transmitting positioning signals to a target object and for receiving alignment signals from the target object when the positioning object and the target object are laterally aligned in a communication path between the positioning object and the target object;
   b) a second transmitter and a second receiver for transmitting the alignment signals from the target object and for receiving the positioning signals at the target object, when the positioning object and the target object are aligned in the communication path between the positioning object and the target object; and
   c) an indicator that indicates when the positioning object and the target are aligned as the positioning object is moved through a trajectory in the communication path between the positioning object and the target object and towards the target object.

2. The positioning and alignment device of claim 1, wherein the second transmitter is a radio-frequency generator for generating radio alignment signals and the first receiver is a radio-frequency receiver for detecting the radio frequency alignment signals.

3. The positioning and alignment device of claim 1, wherein the first transmitter and the first receiver are configured to detachably couple to the positioning object.

4. The positioning and alignment device of claim 1, wherein the second transmitter and the second receiver are configured to be removably positioned near the target object.

5. The positioning and alignment device of claim 1, wherein the indicator comprises a display element.

6. The positioning and alignment device of claim 1, wherein the first transmitter is a laser for generating laser light positioning signals and the second receiver is a photo-sensor for detecting the laser light positioning signals.

7. The positioning and alignment device of claim 6, further comprising a first optical configuration for projecting the laser light into an elongated laser beam.

8. The positioning and alignment device of claim 5, wherein the display element is configured to generate light.

9. The positioning and alignment device of claim 7, further comprising a second optical configuration for filtering background light from the second receiver.

10. A system for tracking a trajectory of an object relative to a target area, the system comprising:
    a) means for generating positioning signals to the target and from the object in a direction corresponding to the trajectory of the object in a path between the object and the target area;
    b) means for detecting the positioning signals at the target area when the object is laterally aligned with the target area and in a path between the object and the target area;
    c) means for generating the alignment signals at the target area when the positioning signals are detected; and
    d) means for detecting the alignment signals at the object.

11. The system of claim 10, wherein the means for generating positioning signals comprises a laser device.

12. The system of claim 10, wherein the means for detecting the positioning signals comprises a photo-detector device.

13. The system of claim 10, wherein the means for generating the alignment signals comprises a radio-frequency transmitter.

14. The system of claim 10, further comprising means to communicate when the trajectory of the object is laterally aligned with the target.

15. The system of claim 11, wherein the laser device is configured to emit an elongated laser beam.

16. The system of claim 12, wherein the photo-detector device is configured to selectively detect laser light.

17. The system of claim 13, wherein the means for detecting the alignment signals comprises a radio frequency receiver.

18. The system of claim 14, wherein the means to communicate comprises a light display element.

19. The system of claim 15, wherein the means for detecting the positioning signals is configured to detect the axial alignment of the object.

20. A positioning and alignment system for monitoring a trajectory of an object along a path towards a target, the system comprising:
    a) a target unit for positioning near the target; and
    b) a positioning unit for coupling to the object, wherein the positioning unit communicates a positioning signal to the target unit along the path and the target unit communicates an alignment signal to the positioning unit along the path when the positioning unit and the target unit are in alignment and, wherein the system monitors the trajectory of the object as the object moves along the path towards the target, wherein the positioning unit is configured to illuminate light when the target unit communicates the alignment signal to the positioning unit.

21. The positioning and alignment system of claim 20, wherein the positioning unit comprises an optical transmitter for communicating with the target unit.

22. The positioning and alignment system of claim 20, wherein the target unit comprises a radio transmitter for communicating with the positioning unit.

23. The positioning and alignment system of claim 20, wherein the positioning unit is configured to couple to a golfing putter and the target unit is configured to be positioned near a golf ball target, wherein the positioning and alignment system monitors positioning and alignment of a golfer's putting trajectory.

24. A system for monitoring the alignment of an object with a target, the system comprising means for providing a two-way communication path between the object and target, the means for providing the two-way communication comprising:
    a) a positioning unit for detachably coupling to the object, the positioning unit comprising a first transmitter, first receiver and an indicator; and
    b) a target unit for positioning near or at the target, the target unit comprising a second transmitter and second receiver, wherein the first transmitter, the first receiver, the second transmitter and the second receiver provide the two-way communication path between the object and the target for monitoring the alignment of the object and wherein the indicator provides an indication when the object is laterally moved in or out of a trajectory along the two-way communication path between the positioning unit and the target unit.

25. A positioning and alignment system for monitoring a trajectory of an object along a path towards a target, the system comprising:
    a) a target unit for positioning near the target; and
    b) a positioning unit for coupling to the object, wherein the positioning unit communicates a positioning signal to the target unit along the path and the target unit communicates an alignment signal to the positioning unit along the path when the positioning unit and the target unit are in alignment and, wherein the system monitors the trajectory of the object as the object moves along the path towards the target, wherein the positioning unit comprises an optical transmitter for communicating with the target unit.

26. A positioning and alignment system for monitoring a trajectory of an object along a path towards a target, the system comprising:
   a) a target unit for positioning near the target; and
   b) a positioning unit for coupling to the object, wherein the positioning unit communicates a positioning signal to the target unit along the path and the target unit communicates an alignment signal to the positioning unit along the path when the positioning unit and the target unit are in alignment and, wherein the system monitors the trajectory of the object as the object moves along the path towards the target, wherein the target unit comprises a radio transmitter for communicating with the positioning unit.

* * * * *